Patented Jan. 16, 1923.

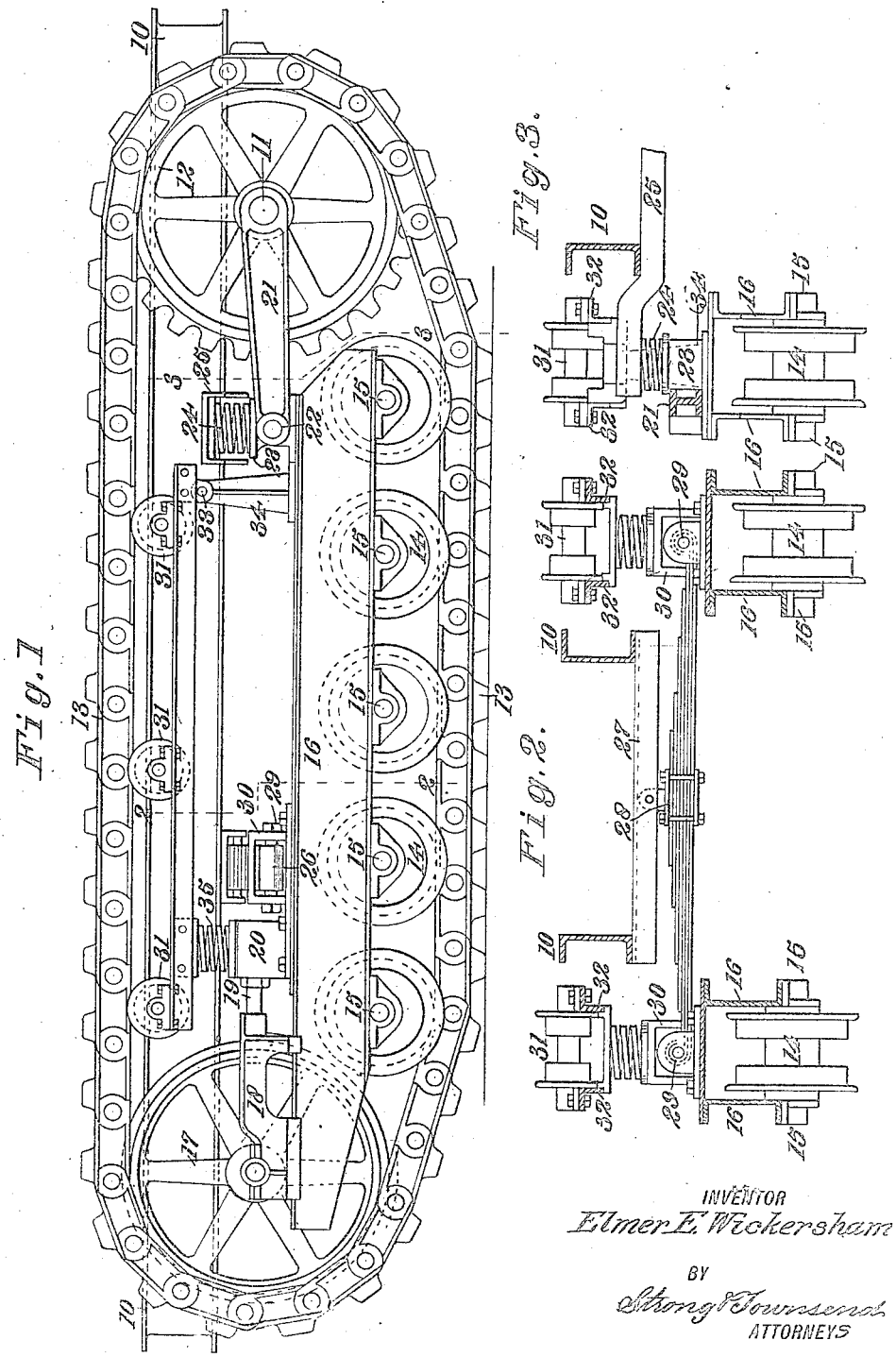

1,442,549

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

CHAIN-TRACK SUPPORT.

Application filed November 27, 1918. Serial No. 264,469.

*To all whom it may concern:*

Be it known that I, ELMER E. WICKERSHAM, a citizen of the United States, residing at Stockton, in the county of San Joaquin and State of California, have invented new and useful Improvements in Chain-Track Supports, of which the following is a specification.

This invention relates to a construction of a chain track tractor and particularly pertains to a chain support therefor. In the operation of tractors having chain tread tracks, there often occurs excessive vibration of the upper run of track chain and it is also common for the upper run of track chains to hang slack under certain conditions of deflection of the truck mechanism.

It is the principal object of this invention to provide a chain support for the above-mentioned portion of the track chain, which will act to yieldably maintain it in a proper relation to the driving sprocket and idler wheel over which it passes, at the same time insuring that all inequalities in its tension will be compensated for by the supporting mechanism as the truck moves in relation to the main frame of the tractor.

The present invention essentially comprises an arm pivotally supported from the rear end of a load supporting truck of a tractor and yieldably supported from the front end of said truck, this arm being provided with a series of idler rollers upon which the upper run of chain track is adapted to rest.

The invention is illustrated in the accompanying drawings in which—

Fig 1 is a view in side elevation, illustrating the track truck equipped with the supporting means with which the present invention is concerned.

Fig. 2 is a view in transverse section, as seen on line 2—2 of Fig. 1, disclosing one manner of connecting the tractor main frame to the trucks disposed at the opposite sides thereof.

Fig. 3 is a view in section and elevation, as seen on line 3—3 of Fig. 1, illustrating a yieldable supporting means provided to carry the main frame as it rests upon the truck units.

In the drawings, 10 indicates a main frame, at the rear end of which is carried a driving axle 11, provided with a suitable power transmission mechanism not shown in the drawings. This axle is fitted with driving sprockets 12, around which an articulate track member 13, passes. Resting upon the lower run of this track is a series of load supporting rollers 14, held in spaced relation to each other by bearings 15. These bearings are fixed to the under-face of a truck frame 16. The rear end of this frame terminates directly in front of the sprocket 12 while the forward end extends alongside the main frame and is formed with a forked portion adapted to accommodate an idler wheel 17. This wheel is mounted by its axle upon sliding bearings 18 adjustably held upon the truck frame by means of a bolt 19 connecting with a block 20 which is fixed upon the truck frame.

As commonly constructed, the sprocket 12 and the idler wheels 17 are embraced by the track tread 13. In the present instance the truck frames 16 are free to float at the opposite sides of the main frame and are connected with the axle 11 by means of thrust rods 21. These rods pivot upon the axis of the axle 11 at their rear ends and extend forwardly to be engaged by stabilizing pins 22 carried by bearings at the rear ends of the trucks. Formed as a part of these bearings is the seat 23, upon which are mounted cushion springs 24. These springs are adapted to receive the outwardly projecting ends of a cross beam 25 and to thus cushion the movement of the main frame in relation to the truck frames, as more particularly shown in Fig. 3. The forward ends of the truck frame are connected by means of a leaf spring 26 which is centrally secured to a transverse beam 27 of the main frame by means of a pivoted spring hanger 28. This hanger is pivoted to the main frame to allow vertical swinging movement of the springs around the longitudinal axis of the frame. The outer ends of the springs 26 are formed with eyes through which bolts 29 extend. These bolts also pass through standards 30, fixed to the upper surface of the truck frames 16. It will thus be readily understood that the truck units may have any desired vertical movement in relation to the main frame, as limited by the action of the thrust rods 21. It will also be apparent that as the truck frames 16 are raised in relation to the main frame, the track chain will be caused to become slack along its upper run. For supporting this portion of the track chain, a series of idler rollers 31 are provided and these rollers are preferably flanged and are carried upon vertically swinging rails 32. As shown in the drawings, three sets of these rollers are mounted for rotatable movement along the rails 32. The rear ends of the rails 32 are provided with pivot pins 33 carried by standards 34. These standards are bolted directly to the truck frame members 16 and extend perpendicularly therefrom. Due to this construction, the rails 32 may swing vertically beneath the chain, as effected in one instance by the weight of the chain thereon and in the other instance by the expansion of a supporting spring 35 interposed beneath the forward ends of the rails 32 and the block 20 on the truck frames.

In operation of the present device, the truck frames may vibrate vertically and as the load supporting rollers 14 do rise, the length of chain required along the lower run of the track would be shortened. This length must, of course, be transferred to the upper run of track and will be supported by the rollers 31. Under ordinary circumstances the simultaneous upward movement of the load supporting rollers 14 and the idler rollers 31, will act to substantially compensate the difference in lengths of the two runs of chain and will hold is in proper tension throughout its length. In the event, however, that the frames 16 vibrate longitudinally, the springs 35 will be compressed or expanded, as the case may require, and the idler rollers 31 constantly held beneath the upper run of chain. It will thus be seen that the chain will be held taut at all times and that excessive vibration and wear will thus be eliminated as well as the noise incident to these objectionable conditions.

Having thus described my invention, what I claim and desire to secure by Letters Patent is—

1. In a vehicle, a main frame, a self-laying track mechanism therefor including a driving and carrying wheel for the track, a load bearing truck within the track pivotally connected to the main frame for rocking movement in a vertical plane independently of said main frame, and a support for the upper run of the track comprising a rail pivotally connected at its rear end to the frame of the load bearing truck, and yieldable means supporting the forward end of the rail upon the truck frame, and a plurality of rollers carried by said rail for engaging and supporting the upper run of the track.

2. In a vehicle, a main frame, a self-laying track mechanism therefor, including a driving and a carrying wheel for the chain track, and a load bearing truck mechanism within the track pivotally connected to the main frame for rocking movement in a vertical plane independently of said main frame, and a support for the upper run of the track comprising a rail, a pivotal connection between the rear end of the rail and the frame of the load bearing truck such that the rail may oscillate in a vertical plane, idler rollers carried by said rail and engaging the upper run of the track, and an extensible coil spring supporting the forward end of the rail and resting upon the truck frame.

3. In a vehicle, a main frame, a self-laying track mechanism at each side thereof including a driving and carrying wheel, and an endless track thereon, and a load bearing truck mechanism within the track pivotally connected to the main frame for vertical rocking movement independently thereof, a standard on the rear end of the truck frame, a girder pivotally connected to the standard, spring means mounted on the forward end of the truck frame and exerting an upward pressure on the forward end of the girder, and a plurality of rollers journaled on the girder and engaging the upper run of the track.

In testimony whereof I have hereunto set my hand in the presence of two subscribing witnesses.

ELMER E. WICKERSHAM.

Witnesses:
JOHN H. HERRING,
W. W. HEALEY.